US012259541B2

United States Patent
Yang et al.

(10) Patent No.: US 12,259,541 B2
(45) Date of Patent: Mar. 25, 2025

(54) RE-IMAGING MICROSCOPY WITH MICRO-CAMERA ARRAY

(71) Applicant: DUKE UNIVERSITY, Durham, NC (US)

(72) Inventors: Xi Yang, Durham, NC (US); Pavan Chandra Konda, Durham, NC (US); Roarke Horstmeyer, Durham, NC (US)

(73) Assignee: DUKE UNIVERSITY, Durham, NC (US)

( * ) Notice: Subject to any disclaimer, the term of this patent is extended or adjusted under 35 U.S.C. 154(b) by 0 days.

(21) Appl. No.: 17/675,538

(22) Filed: Feb. 18, 2022

(65) Prior Publication Data
US 2022/0260823 A1    Aug. 18, 2022

Related U.S. Application Data

(60) Provisional application No. 63/150,671, filed on Feb. 18, 2021.

(51) Int. Cl.
 *G02B 21/36* (2006.01)
 *H04N 23/45* (2023.01)
(52) U.S. Cl.
 CPC ......... *G02B 21/361* (2013.01); *G02B 21/367* (2013.01); *H04N 23/45* (2023.01)
(58) Field of Classification Search
 CPC ..... G02B 21/361; G02B 21/367; H04N 23/45
 See application file for complete search history.

(56) References Cited

U.S. PATENT DOCUMENTS

| | | | | |
|---|---|---|---|---|
| 8,315,476 | B1* | 11/2012 | Georgiev | G02B 27/0075 348/207.99 |
| 10,222,605 | B2 | 3/2019 | Kim et al. | |
| 10,606,055 | B2* | 3/2020 | Horstmeyer | G01T 1/185 |
| 11,487,097 | B1* | 11/2022 | Park | G02B 21/16 |
| 2012/0259204 | A1 | 10/2012 | Carrat et al. | |
| 2013/0070138 | A1* | 3/2013 | Baraniuk | H04N 25/75 348/302 |

(Continued)

OTHER PUBLICATIONS

Lodhi et al. "Computational imaging through a fiber-optic bundle", May 2017.*

(Continued)

*Primary Examiner* — James T Boylan
(74) *Attorney, Agent, or Firm* — Talem IP Law, LLP

(57) ABSTRACT

A microscopy system includes a primary lens and a planar array of micro-cameras. Each micro-camera of the planar array of micro-cameras has a field of view at an intermediate plane that overlaps at least one other micro-camera's field of view at the intermediate plane in a direction. The primary lens is disposed in a light path between the array of micro-cameras and a target area. In some cases, an overlap amount in the direction of the field of view at the intermediate plane for each micro-camera is at least 50%. A method of microscopy imaging includes directing light to a target area and simultaneously capturing a first set of images of the target area while the light illuminates the target area via a planar array of micro-cameras having a field of view at an intermediate plane disposed between a primary lens and the planar array of micro-cameras.

20 Claims, 10 Drawing Sheets

(56) References Cited

U.S. PATENT DOCUMENTS

| | | | |
|---|---|---|---|
| 2015/0374210 A1 | 12/2015 | Durr et al. | |
| 2016/0091705 A1* | 3/2016 | Ben Ezra | G02B 21/361 |
| | | | 348/79 |
| 2016/0255328 A1 | 9/2016 | Fattal et al. | |
| 2016/0309065 A1* | 10/2016 | Karafin | G02B 6/08 |
| 2016/0330360 A1* | 11/2016 | Powell | H04N 23/60 |
| 2016/0337634 A1 | 11/2016 | Huemoeller | |
| 2017/0276923 A1* | 9/2017 | Stoppe | A61B 6/5235 |
| 2017/0324912 A1* | 11/2017 | Lo | H04N 23/58 |
| 2018/0192871 A1* | 7/2018 | Abt | A61B 3/14 |
| 2019/0290111 A1* | 9/2019 | Shademan | A61B 1/0016 |
| 2020/0183142 A1* | 6/2020 | Zheng | G02B 21/082 |
| 2020/0225386 A1* | 7/2020 | Tsai | G02B 1/002 |
| 2020/0345230 A1* | 11/2020 | Thurin | A61B 3/145 |

OTHER PUBLICATIONS

Internet wayback machine "https://web.archive.org/web/20200314103447/https://www.rp-photonics.com/fiber_bundles.html" provides date of Mar. 2020 for RP Photonics encyclopedia website "https://www.rp-photonics.com/fiber_bundles.html".*
Dansereau at al. (A Wide-Field-of-View Monocentric Light Field Camera)—Stanford University, 2017.*
Yang et al. (Snapshot gigapixel-scal imaging at high resolution using a micro-camera array microscope), Conference Presentation, SPIE, Mar. 5, 2021.*
Kim et al. (A Wide Field-of-View Light-field camera with Adjustable Multiplicity for Practical Applications), Sensors, MDPI, Apr. 30, 2022.*
Chiara Bonati et al., "Phase sensitivity in differential phase contrast microscopy: limits and strategies to improve it," Optics Express, Oct. 26, 2020, 17 pages, vol. 28, No. 22.
Christina K Kim et al., "Simultaneous fast measurement of circuit dynamics at multiple sites across the mammalian brain." Nat Methods, Apr. 2016, 15 pages, 13(4).
Canon Global "Canon develops APS-H-size CMOS sensor with approximately 250 megapixels, the world's highest pixel count for its size," Canon Inc. News Release, Sep. 7, 2015, 2 pages.
Brian Patrick Eliceiri "Purchase of Confocal Laser Scanning Microscope," National Institutes of Health, 2015, 4 pages.
Jingtao Fan et al. "Video-rate imaging of biological dynamics at centimetre scale and micrometre resolution," Nature Photonics, Nov. 2019, 10 pages, vol. 13.
Yosuke Fujimaki et al. "Reduction of speckle contrast in multimode fibers using piezoelectric vibrator," Laser Resonators, Microresonators, and Beam Control XVI, Mar. 4, 2014, 8 pages, vol. 8960.
Guoqiang Huang et al. "Retrieving the optical transmission matrix of a multimode fiber using the extended Kalman filter," Optics Express, Mar. 30, 2020, 14 pages, vol. 28, No. 7.
Pavan Chandra Konda et al., "Fourier ptychography: current applications and future promises," Optics Express, Mar. 30, 2020, 28 pages, vol. 28, No. 7.
Deepak Krishnamurthy et al., "Scale-free Vertical Tracking Microscopy: Towards Bridging Scales in Biological Oceanography," bioRxiv, Apr. 15, 2019, 44 pages.
Gail McConnell et al., "A novel optical microscope for imaging large embryos and tissue volumes with sub-cellular resolution throughout," eLife, Sep. 23, 2016, 15 pages.
D. J. Brady et al., "Multiscale gigapixel photography," Nature, Jun. 21, 2012, 4 pages, vol. 486.
Jeffrey P. Nguyen et al., "Whole-brain calcium imaging with cellular resolution in freely behaving Caenorhabditis elegans," PNAS, Dec. 28, 2015, 8 pages.
Eric E. Thomson et al., "Gigapixel behavioral and neural activity imaging with a novel multi-camera array microscope," bioRxiv, Oct. 6, 2021, 37 pages.
Guoan Zheng et al., "0.5 gigapixel microscopy using a flatbed scanner," Biomedical Optics Express, Dec. 2, 2013, 8 pages. vol. 5, No. 1.
Guoan Zheng et al., "Creating a gigapixel superscope for biomedicine," Optics & Photonics News, Apr. 2014, 8 pages.
Cecilia Heyes, "Culture," Current Biology, Oct. 19, 2020, 6 pages.
A. Yu. Sdobnov et al. "Recent progress in tissue optical clearing for spectroscopic application," Spectrochimica Acta Part A: Molecular and Biomolecular Spectroscopy, 2018, 14 pages.
Michael Shribak et al. "Techniques for fast and sensitive measurements of two-dimensional birefringence distributions," Applied Optics, Jul. 2003, 10 pages.
D. L. Marks et al. "Characterization of the AWARE 10 two-gigapixel wide-field-of-view visible imager" Applied Optics, May 1, 2014, 10 pages, vol. 53, No. 13.
Office Action issued in U.S. Appl. No. 18/295,078, mailed Aug. 28, 2024, 19 pages.

* cited by examiner

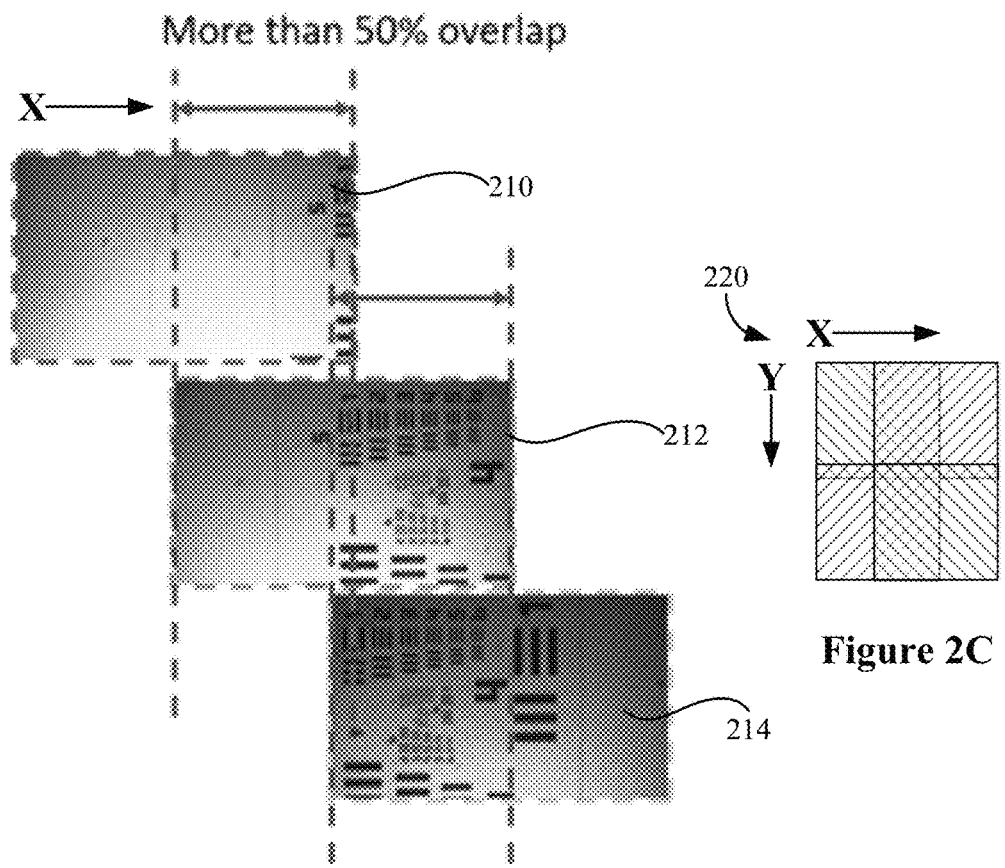
Figure 2C
Figure 2B
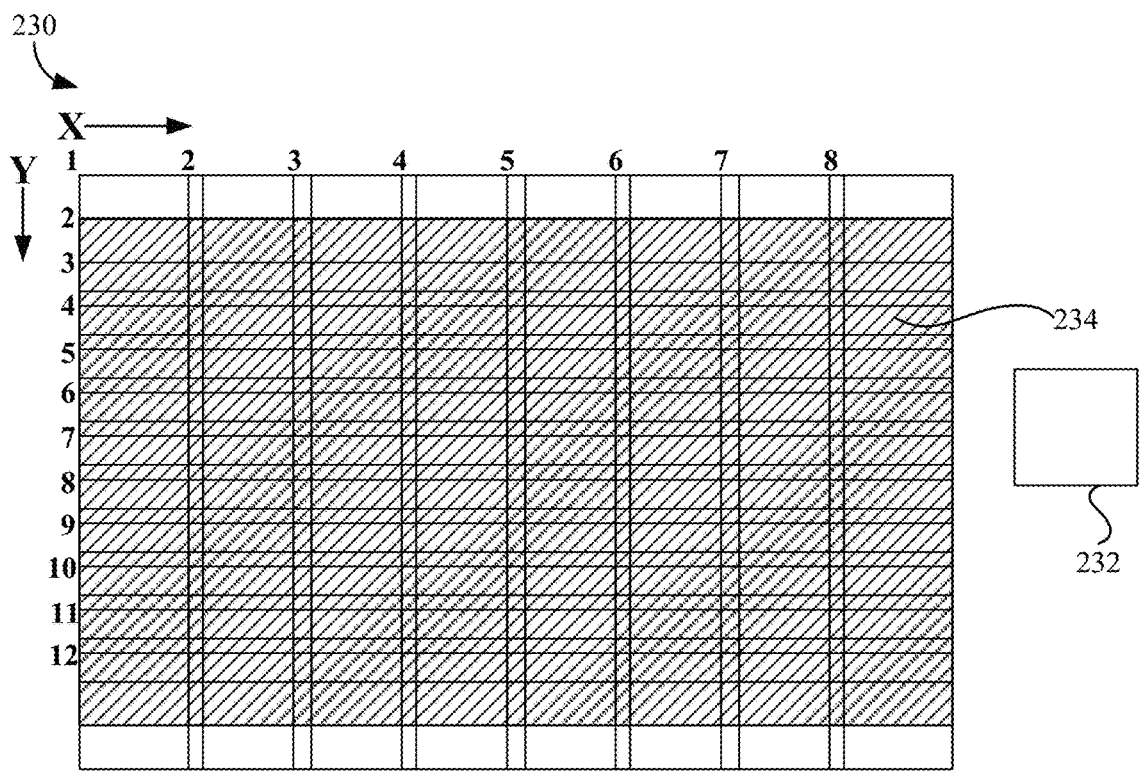
Figure 2D

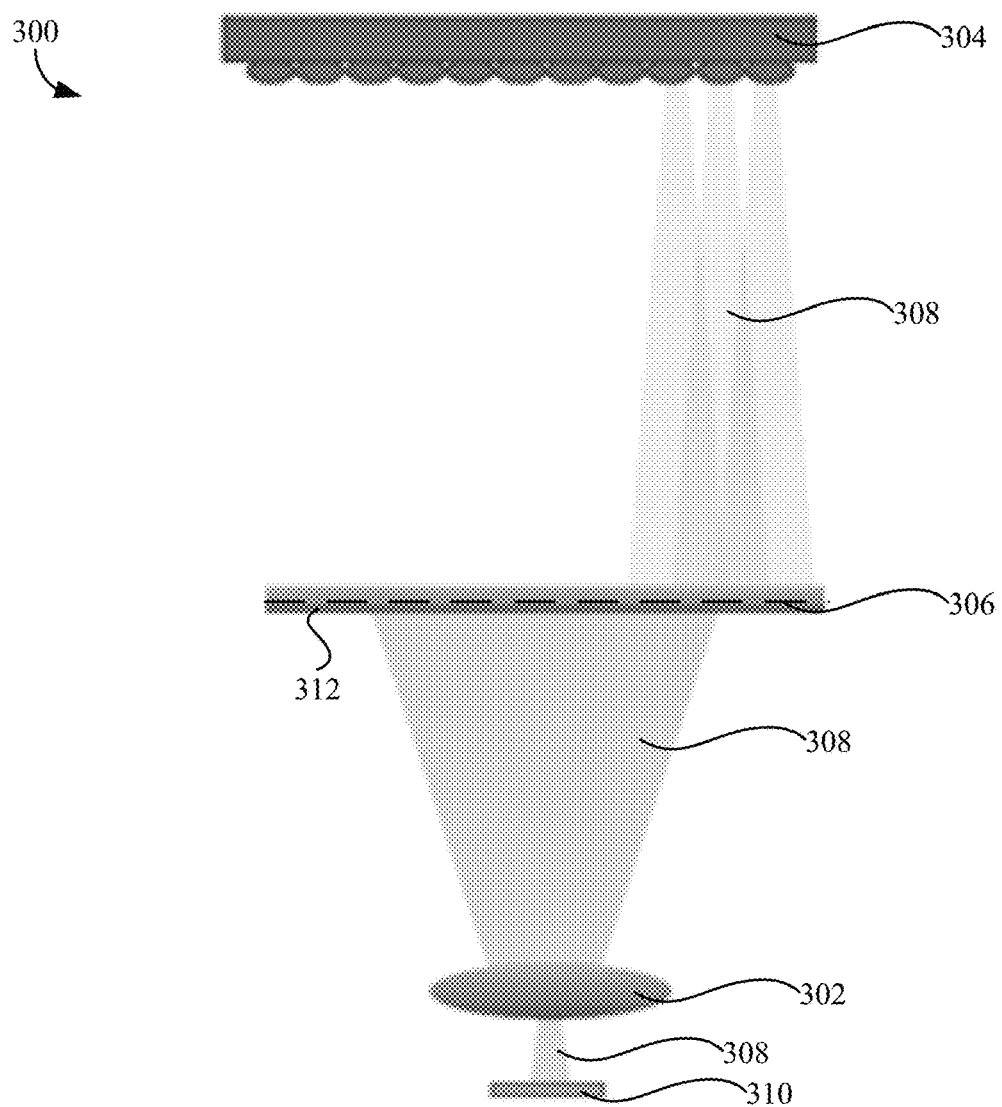
Figure 3A
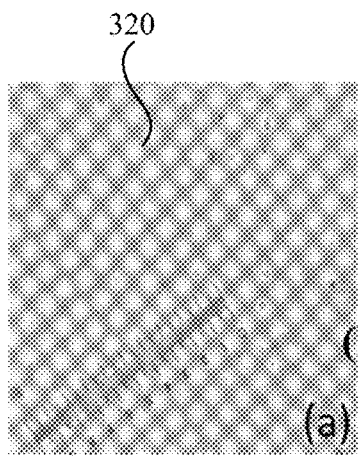
Figure 3B
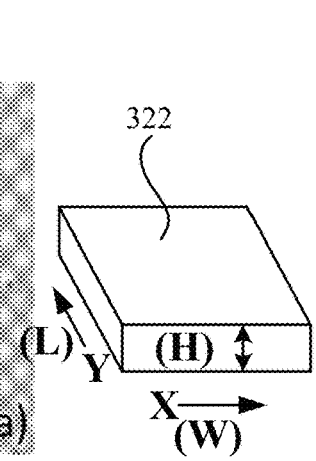
Figure 3C
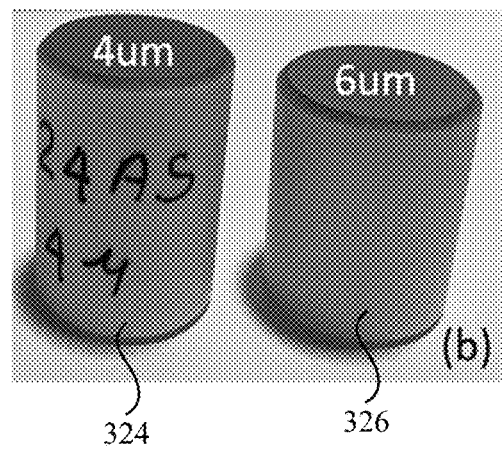
Figure 3D  Figure 3E

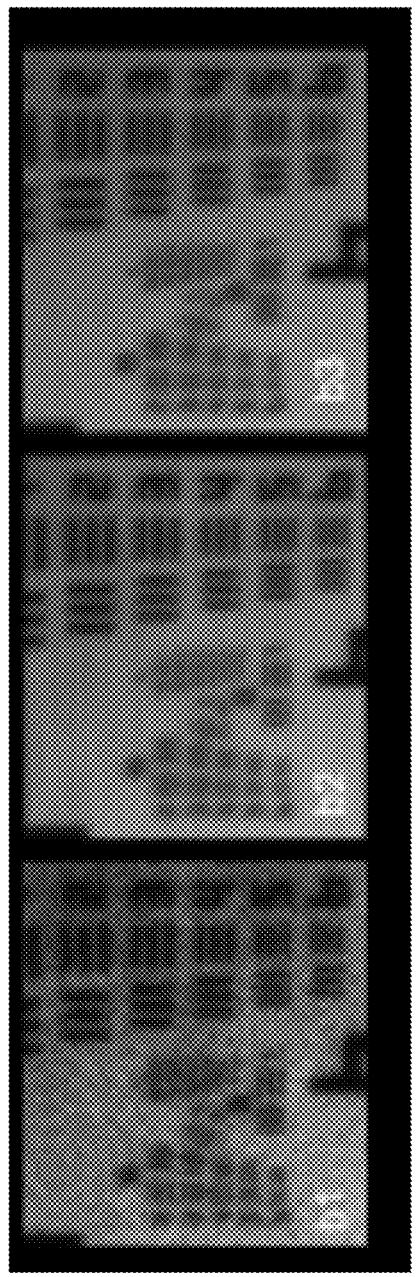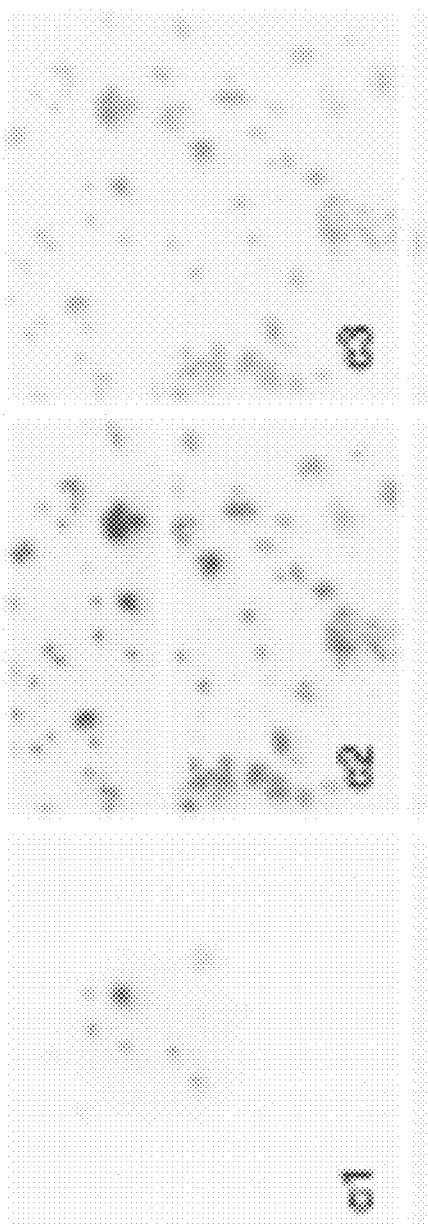
Figure 9A Figure 9B Figure 9C
Figure 10A Figure 10B Figure 10C

Figure 11A
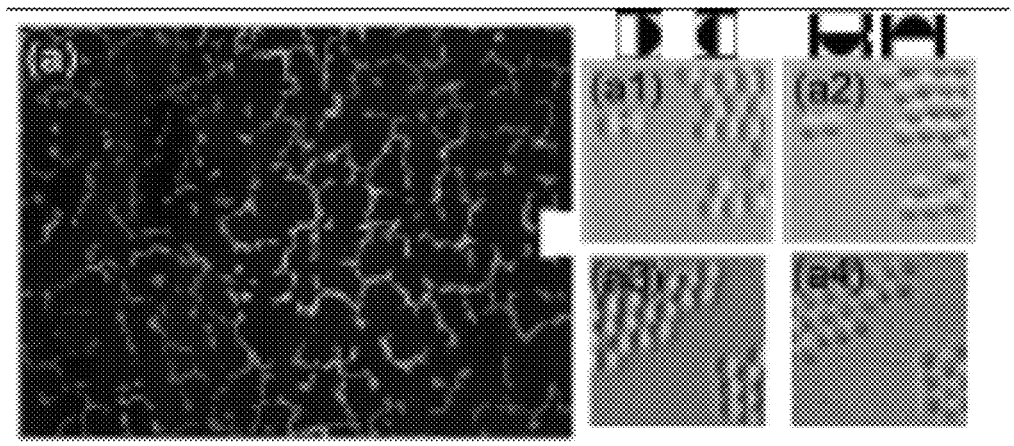
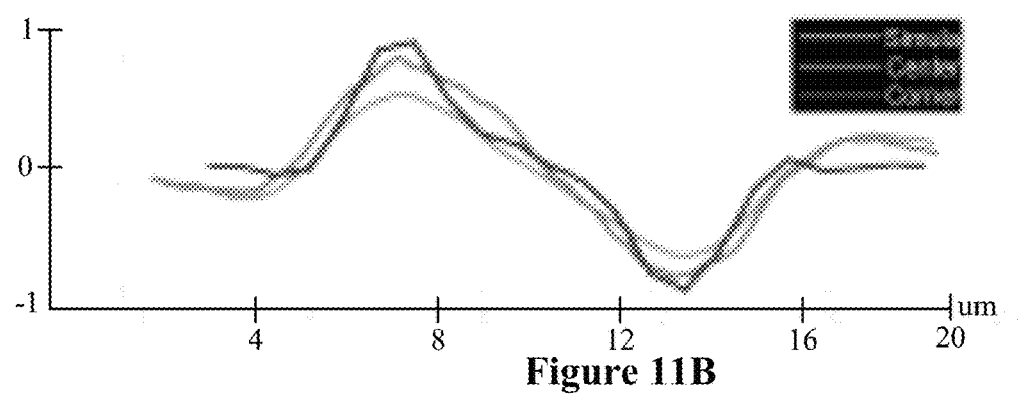
Figure 11B
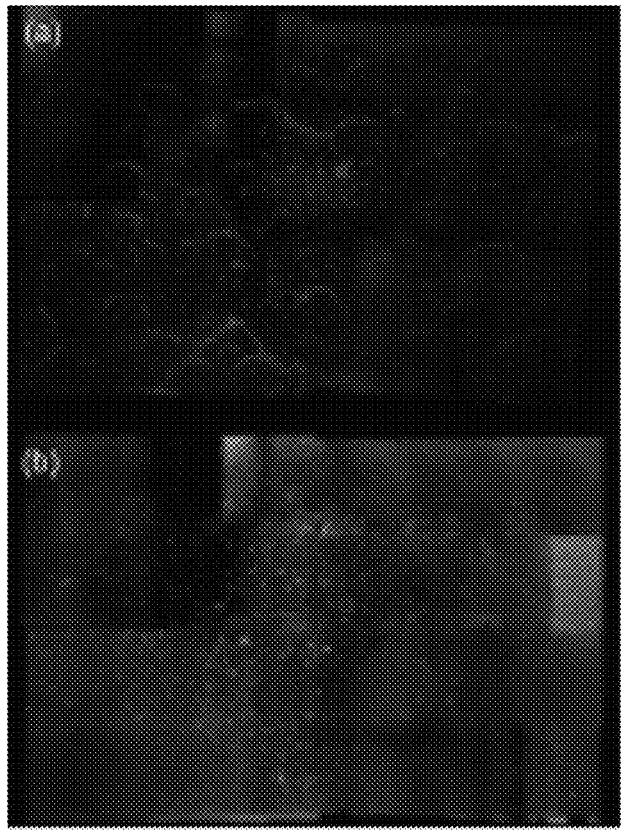
Figure 12A
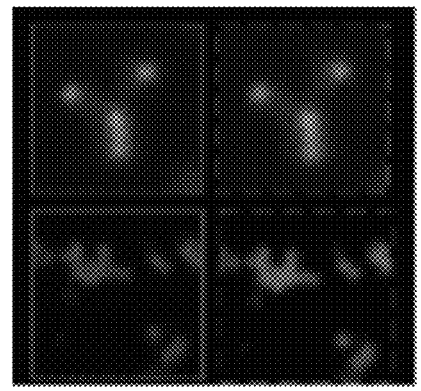
Figure 12C
Figure 12B

RE-IMAGING MICROSCOPY WITH MICRO-CAMERA ARRAY

CROSS-REFERENCE TO RELATED APPLICATION

This application claims the benefit of U.S. Provisional Application Ser. No. 63/150,671, filed Feb. 18, 2021.

BACKGROUND

Pathologists and biomedical researchers often need to image across centimeter-scale areas at micrometer resolution (e.g., whole-slide imaging). The most common method of conducting whole-slide imaging uses a scanning microscope and moving either the specimen and/or imaging lens while acquiring a sequence of images over time that are used to generate a composite image of the entire specimen. Unfortunately, because the images that are used to generate the composite image are taken over time, important information can be impossible to obtain, such as movement of organisms within the specimen and movement of a collection of cells within the specimen.

Other systems have tried to resolve these issues by improving primary lenses and images sensors, however, the prohibitive cost of a primary lens that can resolve a centimeter-scale area at micrometer resolution (e.g., a lens having gigapixel capabilities) and the prohibitive cost of a digital image sensor that is capable of capturing the micrometer resolution at centimeter-scale areas has prevented widespread adoption. Furthermore, in addition to being cost prohibitive, primary lenses and digital image sensors in these systems still do not provide gigapixel capabilities (e.g., they are an order of magnitude less than what is achieved via traditional sequence imaging performed by existing scanning microscopes) and these digital sensors provide a very low imaging frame rate. Furthermore, none of the systems used today provide the ability to capture 3D image information and cannot easily record multiple fluorescence and/or polarization channels in a single snapshot.

Micro-camera arrays have been utilized to attempt re-imaging techniques to resolve some of these issues, however, the field of view is still too small, and some of these systems require a curved intermediate plane to avoid spherical aberration introduced by the primary lens, resulting in a curved micro-camera array which requires expensive opto-mechanical calibration and precludes arranging all of the image sensors onto a single printed circuit board (PCB). In other micro-camera arrays that have been used, the micro-camera arrays are used to directly image the specimen (e.g., without a primary lens and associated intermediate plane needed to achieve the high resolution required) and are therefore not re-imaging systems.

BRIEF SUMMARY

Re-imaging microscopy systems and methods that provide a large field of view (e.g., centimeter-scale areas) at high resolution (e.g., micrometer resolution) at a relatively low cost are provided. By using a macro-camera lens as the primary lens (e.g., a single lens), the space bandwidth product (SBP) of the re-imaging microscopy systems disclosed herein can achieve the hundreds of megapixels up to gigapixels capability. Likewise, with a planar array of micro-cameras having a field of view at an intermediate plane, the cumulative pixel count of the digital sensors can achieve gigapixel capabilities. Furthermore, with a field of view of each micro-camera of the planar micro-camera array overlapping at least one other micro-camera's field of view at the intermediate plane in a direction (e.g., with the overlapping being 50% or more), snapshot 3D imaging, multi-channel fluorescence and/or polarimetry functionality is enabled by the disclosed re-imaging microscopy systems.

A microscopy system includes a primary lens and a planar array of micro-cameras. Each micro-camera of the planar array of micro-cameras has a field of view at an intermediate plane that overlaps at least one other micro-camera's field of view at the intermediate plane in a direction. The primary lens is disposed in a light path between the array of micro-cameras and a target area.

In some cases, an overlap amount in the direction of the field of view at the intermediate plane for each micro-camera is at least 50%. In some cases, the system further includes an intermediate platform disposed at the intermediate plane in the light path between the array of micro-cameras and the primary lens. In some cases, the intermediate platform includes a fiber bundle array. In some cases, fibers of the fiber bundle array are glass. In some cases, the intermediate platform includes a diffuser element.

In some cases, the system further includes at least one filter on at least one micro-camera of the array of micro-cameras. In some cases, the at least one filter is an emission filter that selectively passes a range of wavelengths of light. In some cases, the at least one filter includes at least two filters that selectively pass different ranges of wavelengths of light. In some cases, the at least two filters of different wavelengths include a red-light filter and a green-light filter. In some cases, the at least one filter is a polarizing filter.

In some cases, the system further includes an illumination source configured to provide light from a plurality of directions to the target area. In some cases, the illumination source is further configured to provide light from a single direction of the plurality of directions at a time. In some cases, the planar array of cameras captures an image of the target area for each of the plurality of directions.

A method of microscopy imaging includes directing light to a target area and simultaneously capturing a first set of images of the target area while the light illuminates the target area via a planar array of micro-cameras having a field of view at an intermediate plane disposed between a primary lens and the planar array of micro-cameras. Each micro-camera of the planar array having a field of view at an intermediate plane that overlaps at least one other micro-camera's field of view in a direction. A different image of the first set of images is simultaneously captured by each micro-camera of the planar array.

In some cases, the method further includes generating a first composite image by stitching the first set of images together. In some cases, the method further includes simultaneously capturing a second set of images of the target area while the light illuminates the target area via the planar array of micro-cameras and generating a second composite image by stitching the second set of images together. In some cases, the method further includes generating a phase contrast image using at least the first composite image and the second composite image, wherein the light illuminates the target area from a different direction for the first set of images than the light that illuminates the target area for the second set of images.

In some cases, the light is introduced to the target area by at least one light source coupled to a moveable arm. In some cases, the light is introduced to the target area via one or more lights of a plurality of lights. In some cases, the light is introduced to the target area through an aperture of a plurality of apertures of an illumination source.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 2B-2D illustrate overlap of fields of view of micro-cameras of a planar micro-camera array focused.

FIG. 3A illustrates a re-imaging microscopy system with a planar micro-camera array and an intermediate platform at an intermediate plane.

FIG. 3B illustrates a portion of a fiber bundle array used at the intermediate platform.

FIG. 3C illustrates a fiber bundle array.

FIGS. 3D and 3E illustrate fibers that can be used in a fiber bundle array.

FIGS. 9A-9C illustrate experimental imaging results using a time averaging method and a frames averaging method.

FIGS. 10A-10C illustrates experimental imaging results utilizing a fiber bundle array.

FIGS. 11A and 11B illustrate experimental imaging results of phase contrast imaging.

FIGS. 12A-12C illustrate experimental imaging results of dual-channel fluorescence imaging.

DETAILED DESCRIPTION

Re-imaging microscopy systems and methods that provide a large field of view (e.g., centimeter-scale areas) at high resolution (e.g., micrometer resolution) at a relatively low cost are provided. By using a macro-camera lens as the primary lens (e.g., a single lens), the space bandwidth product (SBP) of the re-imaging microscopy systems disclosed herein can achieve the hundreds of megapixels up to gigapixels capability. Likewise, with a planar array of micro-cameras having a field of view at an intermediate plane, the cumulative pixel count of the digital sensors can achieve gigapixel capabilities. Furthermore, with a field of view of each micro-camera of the planar micro-camera array overlapping at least one other micro-camera's field of view at the intermediate plane in a direction (e.g., with the overlapping being 50% or more), snapshot 3D imaging, multi-channel fluorescence and/or polarimetry functionality is enabled by the disclosed re-imaging microscopy system.

There are numerous possible applications for the disclosed re-imaging microscopy system. One non-limiting example application is in vivo model organism imaging. By offering a large field of view and high resolution, the disclosed re-imaging microscopy system can observe organisms at the cellular level as they move unconstrained within a specimen. The re-imaging microscopy system can similarly be used in in vitro cell-culture imaging experiments. Other examples include whole-slide imaging in pathology, cytopathology, and hematology, examining large tissue sections, and large field of view light-sheet imaging experiments. The re-imaging microscopy system can also achieve optimized illumination patterns with specific examples using a convolution neural network (CNN) or other machine learning algorithms.

Figure 1:
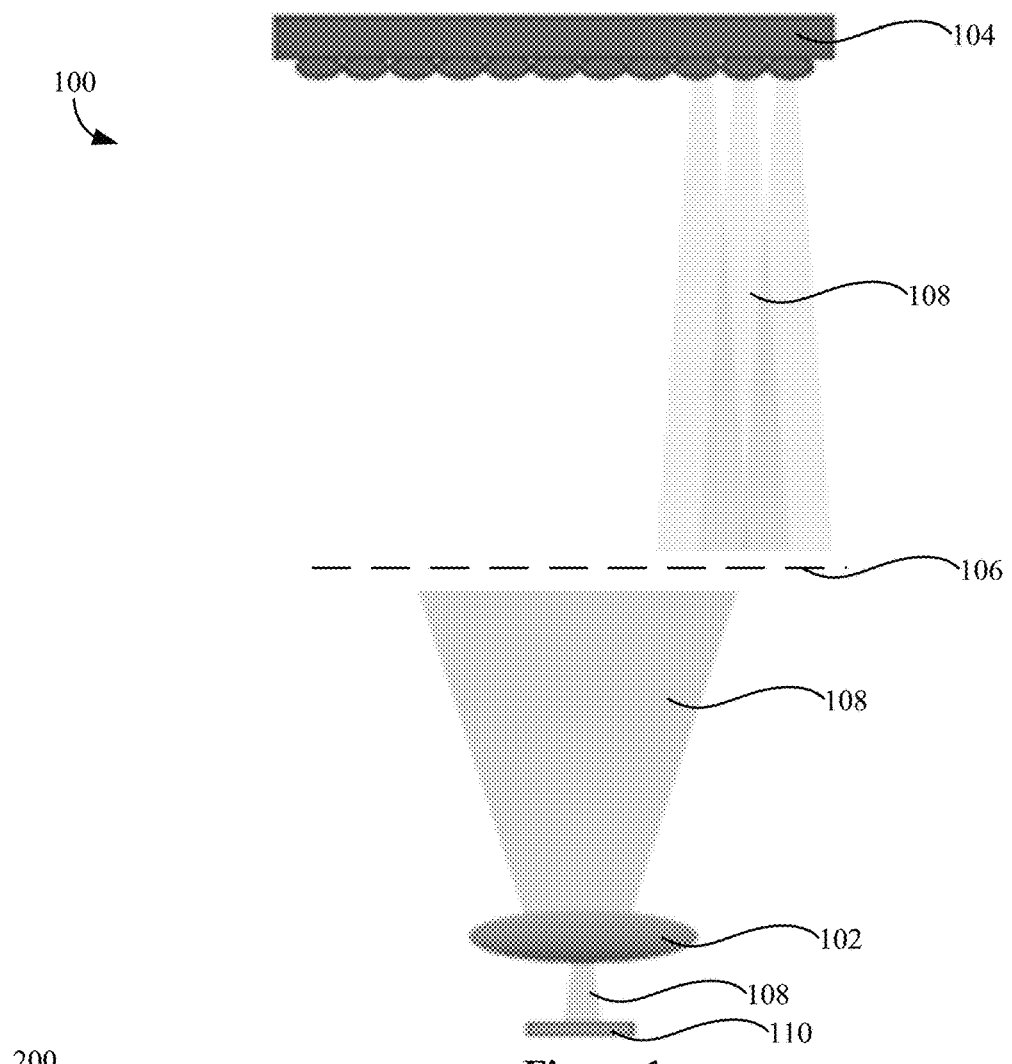
FIG. 1 illustrates a re-imaging microscopy system with a micro-camera array.

FIG. 1 illustrates a re-imaging microscopy system with a micro-camera array. Referring to FIG. 1, a microscopy system 100 includes a primary lens 102 and a planar array of micro-cameras 104. Each micro-camera of the planar array of micro-cameras 104 has a field of view at an intermediate plane 106 that overlaps at least one other micro-camera's field of view at the intermediate plane 106 in a direction. The primary lens 102 is disposed in a light path 108 between the planar array of micro-cameras 104 and a target area 110 (e.g., a specimen). The primary lens 102 can be a high throughput lens (such as megapixel, gigapixel, or self-designed lens). An image of the target area 110 is formed on the back focal plane (e.g., at the intermediate image plane 106) which can be captured by the planar array of micro-cameras 104.

Figure 2A:
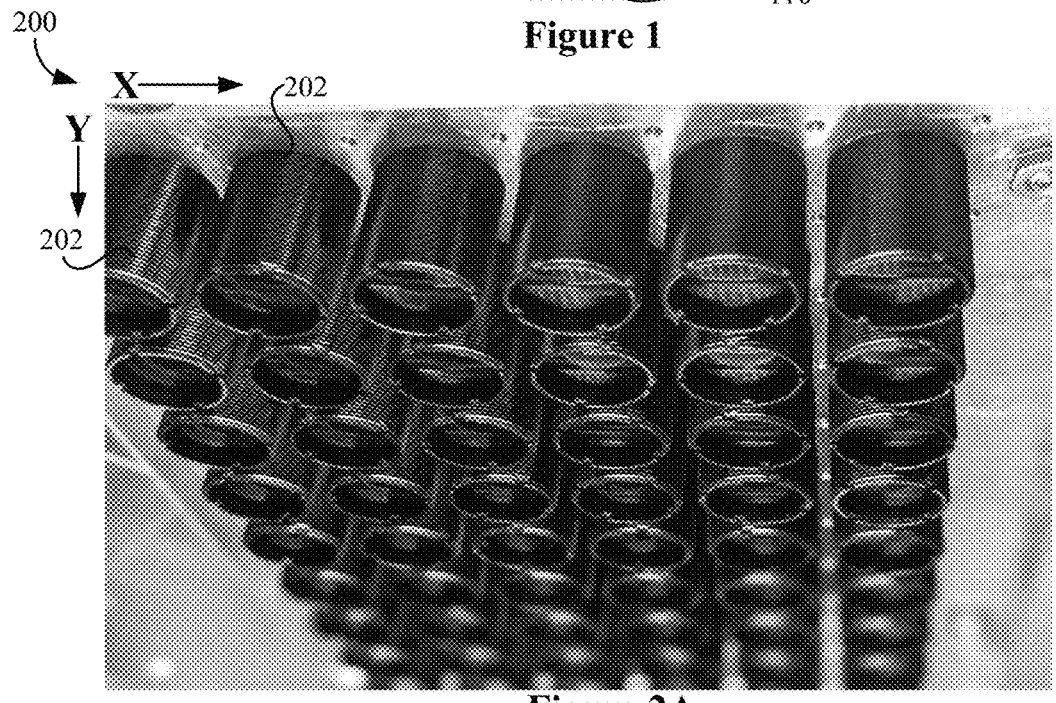
FIG. 2A illustrates a planar micro-camera array.

FIG. 2A illustrates a planar micro-camera array. Referring to FIG. 2A, a planar array of micro-cameras 200 includes a plurality of micro-cameras 202 aligned in an X direction and a plurality of micro-cameras 202 in a Y direction. This grid of micro-cameras 202 can be spaced to allow for the field of view of each micro-camera 202 to overlap with the field of view of the micro-camera 202 next to it (e.g., in the X and/or Y direction). Furthermore, the planar array of micro-cameras 200 is flat (e.g., no curvature), which allows for each of the micro-cameras 202 to be integrated into a single printed circuit board (PCB) in some cases.

FIGS. 2B-2D illustrate overlap of fields of view of micro-cameras of a planar micro-camera array. Referring to FIG. 2B, a field of view 210, 212, 214 for three micro-cameras (e.g., 202 of FIG. 2A) aligned in an X direction is illustrated. The first field of view 210 shares at least a 50% overlap with second field of view 212 and even some overlap with the third field of view 214 in the X direction. For example, assuming the overlap between the first field of view 210 (e.g., for a first micro-camera) and the second field of view 212 (e.g., for a second micro-camera that is positioned directly beside the first micro-camera in the X direction) is 53% in the X direction, and the overlap between the second field of view 212 (e.g., for the second micro-camera) and the third field of view 214 (e.g., for a third micro-camera that is positioned directly beside the second micro-camera in the X direction) is 53% in the X direction, then the overlap amount between the first field of view 210 and the third field of view 214 is 6%. Therefore, by having at least 50% overlap between fields of view of micro-cameras in a direction, 3D imaging and multi-channel fluorescence and/or polarimetry functionality can be achieved, as explained in further detail with respect to FIGS. 4A and 4B.

Referring to FIG. 2C, overlapping fields of view 220 for a 2×2 micro-camera array are illustrated. In this case, an overlap amount in the X direction of the field of view at the intermediate plane for each micro-camera is at least 50%, so the overlap amount of overlapping fields of view 220 is simultaneously captured by at least two micro-cameras of the micro-camera array. In other cases, the overlap amount may be at least 50% in the Y direction of the field of view for each micro-camera. In some cases, the overlap amount may be at least 50% in the X and Y direction for each micro-camera. Furthermore, in this case, there is a relatively small overlap amount of the field of view for each micro-camera in the Y direction, which can be useful for creating the composite image. However, an overlap amount is not required in the Y direction for creating the composite image, although there should not be a gap in any direction of the overlapping fields of view 220.

Referring to FIG. 2D, overlapping fields of view 230 for an 8 (e.g., number of micro-cameras in the X direction)×12 (e.g., number of micro-cameras in the Y direction) micro-camera array is illustrated. A reference field of view 232 is illustrated to show the size of each individual field of view. In this case, an overlap amount in the Y direction of the field of view at the intermediate plane for each micro-camera is at least 50%, so the entire shaded portion 234 of the overlapping fields of view 230 is simultaneously captured by at least two micro-cameras of the micro-camera array. In other cases, the overlap amount may be at least 50% in the X direction of the field of view for each micro-camera. In some cases, the overlap amount may be at least 50% in the X and Y direction for each micro-camera.

Furthermore, in this case, there is a relatively small overlap amount of the field of view for each micro-camera in the X direction, which can be useful for creating the composite image. However, an overlap amount is not required in the X direction for creating the composite image, although there should not be a gap in any direction of the overlapping fields of view 230. It should be understood that although shown as rectangular shaped, the field of view for each micro-camera may be other shapes, including but not limited to, circular, ovular, square and the like; the functionality described herein as requiring two images of the same portion of a composite image can be utilized by capturing the same portion of the composite image by at least two micro-cameras of the micro-camera array, regardless of the shape of the field of view. In this case, an 8×12 micro-camera array is used to create the overlapping fields of view 230, however, in some cases, the micro-camera array may include as little as a 2×2 micro-camera array to create an overlapping field of view; in other cases, the micro-camera array may include as many as 50×50 micro-camera array to create an overlapping field of view. It should be understood that embodiments may include any number of micro-cameras in the micro-camera array between the 2×2 embodiment and the 50×50 embodiment. In addition, as micro-camera technology reaches smaller footprints, it may be possible to use an array that is larger than 50×50.

FIG. 3A illustrates a re-imaging microscopy system with a planar micro-camera array and an intermediate platform at an intermediate plane. Referring to FIG. 3A, a microscopy system 300 includes a primary lens 302 and a planar array of micro-cameras 304. Each micro-camera of the planar array of micro-cameras 304 has a field of view at an intermediate plane 306 that overlaps at least one other micro-camera's field of view at the intermediate plane 306 in a direction. The primary lens 302 is disposed in a light path 308 between the planar array of micro-cameras 304 and a target area 310 (e.g., a specimen). The system 300 further includes an intermediate platform 312 disposed at the intermediate plane 306 in the light path 308 between the planar array of micro-cameras 304 and the primary lens 302. An image of the target area 310 is formed on the back of the intermediate platform 312, which can be captured by the planar array of micro-cameras 304.

In some cases, the intermediate platform 312 includes a fiber bundle array (e.g., as described in further detail with respect to FIGS. 3B and 3C). In some cases, the intermediate platform 312 includes a diffuser element. In any case, the intermediate platform 312 can re-direct light projected from the primary lens 302 such that the light is no longer primarily at a large angle with respect to an optical axis of a given micro-camera, and instead re-directs the light to travel primarily along the optical axis of a given micro-camera. This re-directing of the light allows for the planar array of micro-cameras 304 to capture more information (e.g., higher resolution) by accounting for non-telecentricity of the primary lens 302.

In some cases, a telecentric lens can be used as the primary lens 302, such that light at the intermediate plane 306 formed by the image-side telecentric primary lens 302 aligns with the optical axis of each micro-camera of the planar array of micro-cameras 304, thus producing an image without vignetting (e.g., which may be the case with respect to primary lens 102 of re-imaging system 100). Unfortunately, it can be expensive and challenging to create a primary lens with a high SBP and image-side telecentricity. Therefore, a non-telecentric lens can be used when an intermediate platform 312 is included to re-direct the light to travel primarily along the optical axis of each micro-camera of the planar array of micro-cameras 304 having their field of view at the corresponding portion of the intermediate platform 312.

FIG. 3B illustrates a portion of a fiber bundle array used at the intermediate platform. FIG. 3C illustrates certain parameters for a fiber bundle array. FIGS. 3D and 3E illustrate fibers that can be used in a fiber bundle array. Referring to FIG. 3B, a fiber faceplate 320 includes a plurality of fibers that are made of glass. Referring to FIGS. 3C-3E, a fiber bundle array 322 may include glass fibers that are 1 μm in width, 1.5 μm in width, 2 μm in width, 2.5 μm in width, 3 μm in width, 4 μm size in width 324, 5 μm in width, and/or 6 μm in width 326. Depending on the width of the glass fibers used in the fiber bundle array 322, there may be up to several billion individual glass fibers in the fiber bundle array 322. The fibers in the fiber bundle array 322 are aligned vertically to re-direct the light to travel primarily along the optical axis of each micro-camera of the planar array of micro-cameras (e.g., 304 of FIG. 3A) having their field of view at the corresponding portion of the intermediate platform (e.g., 312 of FIG. 3A).

The length of each (vertically aligned) fiber in the fiber bundle array 322 may be anywhere with the range of one centimeter to five centimeters, which can correspond to the height/thickness (H) of the fiber bundle array (e.g., because the individual fibers are aligned vertically). The width (W) (e.g., in an X direction) and length (L) (e.g., in a Y direction)

of the fiber bundle array 322 can be any value within the range of five centimeters by five centimeters to 30 centimeters thirty centimeters. It should be understood that although shown as square shaped, the width and length dimensions of an intermediate platform may be altered to include other shapes, including but not limited to, circular, ovular, rectangular and the like depending upon the desired application. Furthermore, an intermediate platform may be incorporated into any of the systems described herein.

In any case, the numerical aperture of the fiber and the fiber size should be larger than the numerical aperture and the resolution in the re-imaging system. Although glass fibers are illustrated in FIGS. 3B, 3D, and 3E, it should be understood that other diffusive materials may be used in a fiber bundle array to achieve the same effect (e.g., re-directing the light from an optical lens to travel primarily along the optical axis for each micro-camera of a micro-camera array).

Figure 4A:
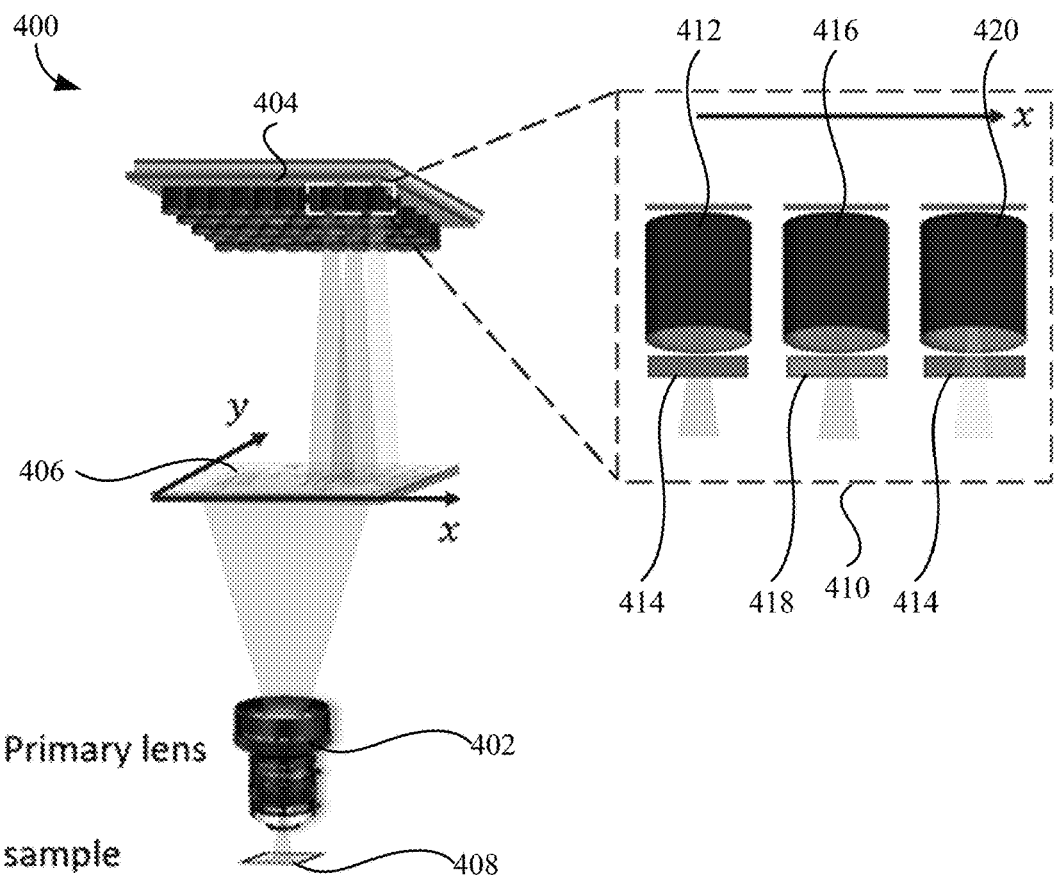
FIG. 4A illustrates a re-imaging microscopy system with a planar micro-camera array having light filters in front of each micro-camera of the planar micro-camera array.

FIG. 4A illustrates a re-imaging microscopy system with a planar micro-camera array having light filters in front of each micro-camera of the planar micro-camera array. Referring to FIG. 4A, a re-imaging microscopy system 400 includes a primary lens 402 and a planar array of micro-cameras 404 having overlapping fields of view in a direction at an intermediate plane 406. Like the other systems described herein, an image of the target area 408 is formed at the intermediate plane 406 which can be captured by the planar array of micro-cameras 404.

Light filters may be included on at least one micro-camera of the planar array of micro-cameras 404. A portion 410 of the planar array of micro-cameras 404 is enlarged to illustrate this concept. As seen in the portion 410 of the planar array of micro-cameras, a first micro-camera 412 aligned in the X direction can include a first type of filter 414, a second micro-camera 416 aligned in the X direction can include a second type of filter 418, and a third micro-camera 420 aligned in the X direction can include the first type of filter 414. Although not illustrated, a fourth micro-camera aligned in the X direction can include the second type of filter 418 such that an alternating pattern of types of filters are used in the planar array of micro-cameras 404.

In some cases, other patterns of types of filters may be used. For example, three types of filters where each type of filter repeats every third micro-camera in a direction may be used. In some cases, four types of filters where each type of filter repeats every fourth micro-camera in a direction may be used. In some cases, four types of filters in a 2×2 grid (e.g., with a type of filter for each micro-camera in the grid) may be used. In some cases, depending on the pattern used, overlap may be increased/decreased. For example, to get simultaneous composite images for each type of filter using an alternating pattern of two different types of filters (e.g., one composite image for each type of filter), at least 50% overlap is required for those micro-camera's field of view at the intermediate plane in the direction of the alternating pattern (e.g., the X direction as applied to the portion 410 example). As another example, to get simultaneous composite images for each type of filter using a pattern where each type of filter repeats every third micro-camera in a direction, at least 67% overlap is required for those micro-camera's field of view at the intermediate plane in the direction. As another example, to get simultaneous composite images for each type of filter using a pattern where each type of filter repeats every fourth micro-camera in a direction, at least 75% overlap is required for those micro-camera's field of view at the intermediate plane in the direction. As yet another example, to get simultaneous composite images for each type of filter using a 2×2 grid pattern, at least 50% overlap is required for those micro-camera's field of view at the intermediate plane in the X and Y direction.

By using patterns of different types of light filters, multi-channel imaging, multi-channel fluorescence imaging and/or polarization imaging can be achieved with the re-imaging microscopy system 400. For example, fluorescence requires one or more excitation illumination sources to illuminate the target area 408 to cause the target area 408 to emit fluorescent light. For dual-channel fluorescence imaging, at least 50% overlap provides an extra channel for dual-labeling experiments. Using an alternating pattern of two different types of filters, the re-imaging microscopy system 400 can simultaneously capture signals from dual-labeling living cells within the specimen/target area 408. As another example, polarization typically requires polarized illumination, although it is not necessary for the illumination itself to be polarized. In some cases, the illumination source can be white light (or some color of light) or light from LEDs that passes through an analyzer/polarizer placed between the light source and the target area. In some cases, polarizing filters (e.g., filters 414, 418) can be positioned in front of micro-cameras (e.g., 412, 416, 420) of the planar array micro-cameras 404. For dual polarization imaging, the re-imaging microscopy system 400 can provide measurements of polarization in one snapshot by inserting a different analyzer into the adjacent lens in the lens array with a polarizer before the target area (e.g., between the illumination source and the specimen), which can reconstruct the birefringence of the target area.

Figure 4B:
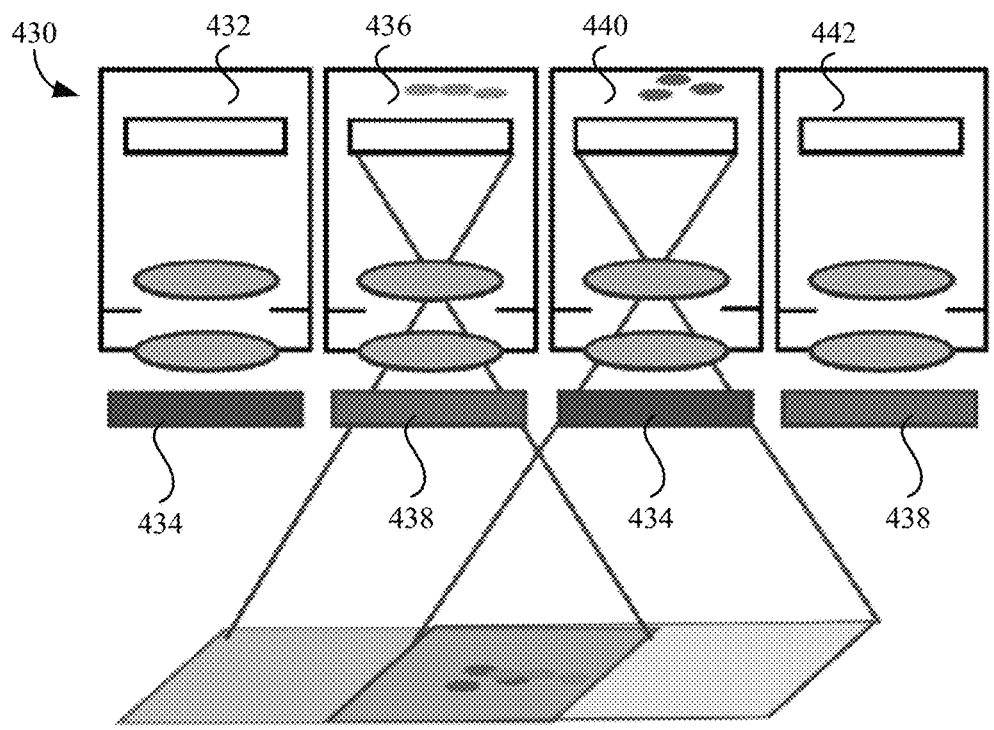
FIG. 4B illustrates a portion of micro-camera array having light filters in front of each micro-camera of the planar micro-camera array.

FIG. 4B illustrates a portion of micro-camera array having light filters in front of each micro-camera of the planar micro-camera array. Referring to FIG. 4B, a portion 430 of a micro-camera array having light filters in an alternating pattern includes a first micro-camera 432 aligned in the X direction that includes a first type of filter 434, a second micro-camera 436 aligned in the X direction that includes a second type of filter 438, a third micro-camera 440 aligned in the X direction that includes the first type of filter 434, and a fourth micro-camera 442 aligned in the X direction that includes the second type of filter 438.

In some cases, one or more types of filters used are emission filters. In some cases, one or more types of filters used are fluorescence emission filters. In some cases, the types of emission filters and/or fluorescence emission filters include a red light filter that selectively passes wavelengths of red light, a green light filter that selectively passes wavelengths of green light, a blue light filter that selectively passes wavelengths of blue light, and/or a yellow light filter that selectively passes wavelengths of yellow light. In some cases, at least two filters that selectively pass different ranges of wavelengths of light in a pattern include a red light filter and a green light filter. In some cases, at least two filters of different wavelengths in a pattern include any of the types of filters (e.g., including polarization filters) described herein.

Figure 5A:
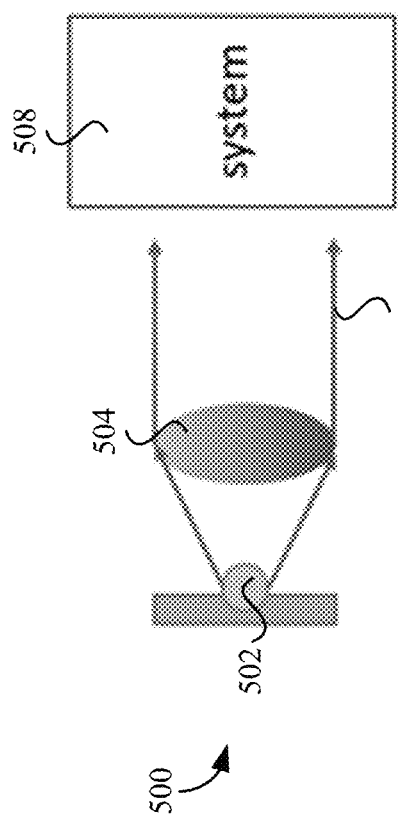
FIG. 5A illustrates a normal illumination design that can be used with the described re-imaging microscopy system.

FIG. 5A illustrates a normal illumination design that can be used with the described re-imaging microscopy system. Referring to FIG. 5A, a normal illumination design 500 includes an LED illumination source 502 and a condenser lens 504 to re-direct light into a parallel or converging beam of light 506 to illuminate the target area of a re-imaging microscopy system 508, which may be implemented as described herein.

Figure 5B:
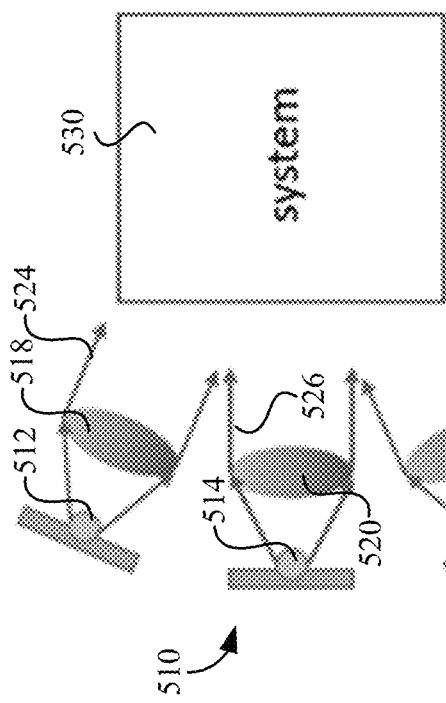
FIG. 5B illustrates an illumination design for phase-contrast imaging that can be used with the described re-imaging microscopy system.

FIG. 5B illustrates an illumination design for phase-contrast imaging that can be used with the described re-imaging microscopy system. Referring to FIG. 5B, an illumination design 510 for phase contrast imaging includes three different LED illumination sources 512, 514, 516 and a corresponding condenser lens 518, 520, 522 for each LED illumination source 512, 514, 516 to re-direct light into a parallel or converging beams of light 524, 526, 528 to illuminate the target area of a re-imaging microscopy system 530, which may be implemented as described herein, from three different directions. In some cases, the re-imaging microscopy system 530 further includes a system controller (e.g., system controller 800 of FIG. 8A) coupled to the components of illumination design 510 to illuminate one LED illumination source 512, 514, 516 at a time to provide light 524, 526, 528 from a single direction of the three directions at a time. For example, the system controller may send a first signal to illuminate LED illumination source 512 first (thereby providing light 524 to the specimen first, in which the re-imaging microscopy system 530 can image the specimen using light from that first direction), send a second signal to illuminate LED illumination source 514 second (thereby providing light 526 to the specimen second, in which the re-imaging microscopy system 530 can image the specimen using light from that second direction), and send a third signal to illuminate LED illumination source 516 third (thereby providing light 528 to the specimen third, in which the re-imaging microscopy system 530 can image the specimen using light from that third direction).

In some cases, light is introduced to the target area by at least one illumination source coupled to a moveable arm. In some cases, the moveable arm can be moved by a user. In some cases, the moveable arm can be moved by servo motors that receive control signals from a system controller. In some cases, light is introduced to the target area through an aperture of a plurality of apertures positioned between the illumination source and the target area. For example, a dark box including a plurality of apertures may be positioned between the illumination source and the target area and be configured to open one aperture of the plurality of apertures at a time (e.g., manually or via a servo motor receiving signals from a system controller) to provide light from several different directions (with light from one direction at a time).

It should be understood that, for an illumination design 510 for phase contrast imaging, more or fewer than three different directions of light (and associated illumination sources and condenser lenses to enable light from that number of directions) may be included. In some cases, an illumination design 510 for phase contrast imaging may use light from a range of two to ten different directions.

Figure 5C:
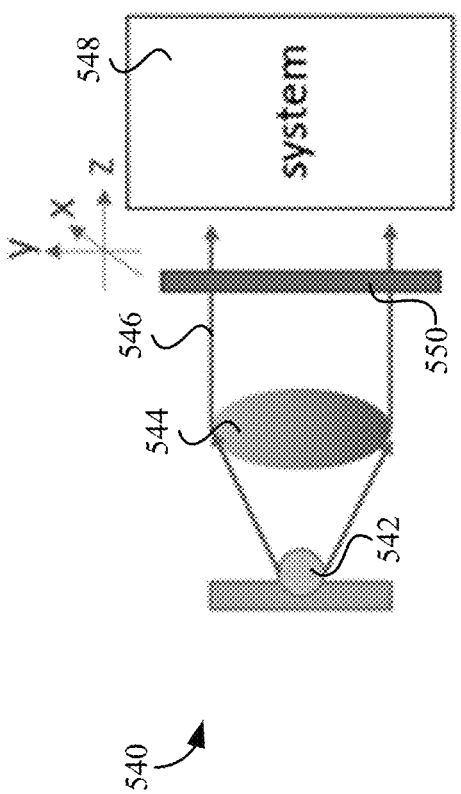
FIG. 5C illustrates an illumination design for dual-channel polarization imaging that can be used with the described re-imaging microscopy system.

FIG. 5C illustrates an illumination design for dual-channel polarization imaging that can be used with the described re-imaging microscopy system. Referring to FIG. 5C, an illumination design 540 for dual-channel polarization imaging includes an LED illumination source 542, a condenser lens 544 to re-direct light into a parallel or converging beam of light 546 to illuminate the target area of a re-imaging microscopy system 548 (which may be implemented as described herein), and a rotating polarizer 550 between the condenser lens 544 and the target area of the re-imaging microscopy system 548. The rotating polarizer 550 provides the ability to capture dual-channel polarization images. In some cases, the re-imaging microscopy system 548 further includes a system controller (e.g., system controller 800 of FIG. 8A) coupled to the illumination design 540 to control the rotating polarizer 550. In some cases, polarizing filters positioned in front of one or more micro-cameras of a planar micro-camera array are included in the re-imaging microscopy system.

Figure 5D:
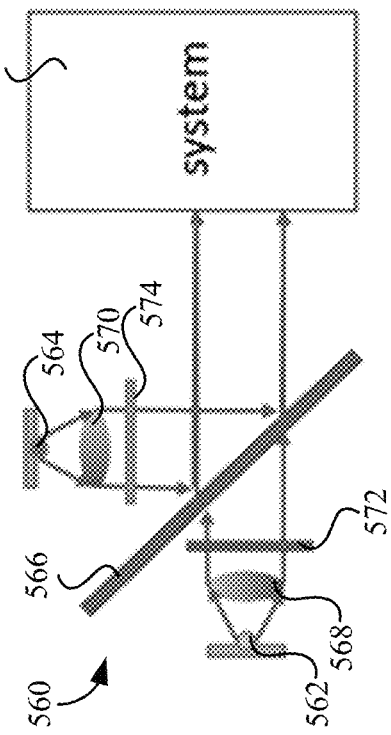
FIG. 5D illustrates an illumination design for dual-channel fluorescence imaging that can be used with the described re-imaging microscopy system.

FIG. 5D illustrates an illumination design for dual-channel fluorescence imaging that can be used with the described re-imaging microscopy system. Referring to FIG. 5D, an illumination design 560 for dual-channel fluorescence imaging includes two LED illumination sources 562, 564 on perpendicular sides of a dichroic mirror 566, two condenser lenses 568, 570 corresponding to the two LED illumination sources 562, 564, two excitation filters 572, 574 corresponding to the two LED illumination sources 562, 564, with the dichroic mirror directing light from the two LED illumination sources 562, 564 towards a re-imaging microscopy system 576, which may be implemented as described herein. In some cases, the re-imaging microscopy system 576 further includes a system controller (e.g., system controller 800 of FIG. 8A) coupled to the illumination design 560 to control the illumination sources 562, 564.

Figure 6:
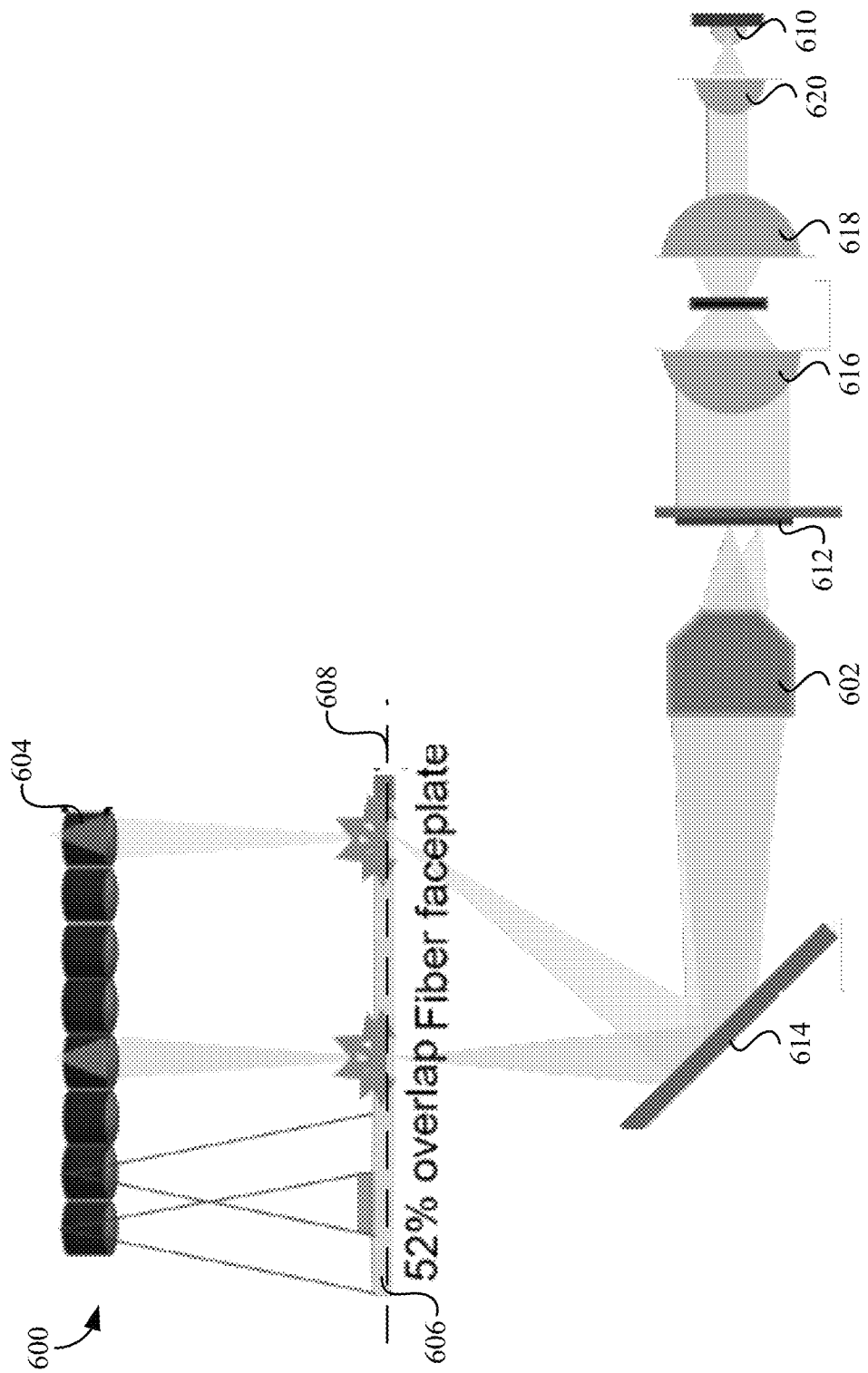
FIG. 6 illustrates a specific implementation of a re-imaging microscopy system with a planar micro-camera array.

FIG. 6 illustrates a specific implementation of a re-imaging microscopy system with a planar micro-camera array. Referring to FIG. 6, a re-imaging microscopy system 600 includes a primary lens 602, a planar array of micro-cameras 604, a fiber bundle array 606 disposed at an intermediate plane 608, an illumination source 610, a specimen 612 (e.g., positioned at a target area), a surface mirror 614, and three condenser lenses 616, 618, 620. Each micro-camera of the planar array of micro-cameras 604 have a field of view focused at the intermediate plane 608 that overlaps at least one other micro-camera's field of view at the intermediate plane 608 in a direction.

Following a light path generated by the illumination source 610, light passes through the three condenser lenses 616, 618, 620 to illuminate the specimen 612. Light from the specimen 612 then passes through the primary lens 602 and is redirected off the surface mirror 614 to the fiber bundle array 606. A composite image can then be captured by the planar array of micro-cameras 604 that is formed on the backside of the fiber bundle array 606. The surface mirror 614 is included to provide the necessary distance between the primary lens 602 and the fiber bundle array 606 for an image of the specimen to be focused at the intermediate plane 608 so that the re-imaging microscopy system 600 suitable for ergonomic use (e.g., allows for the re-imaging microscopy system 600 to be compact).

Figure 7:
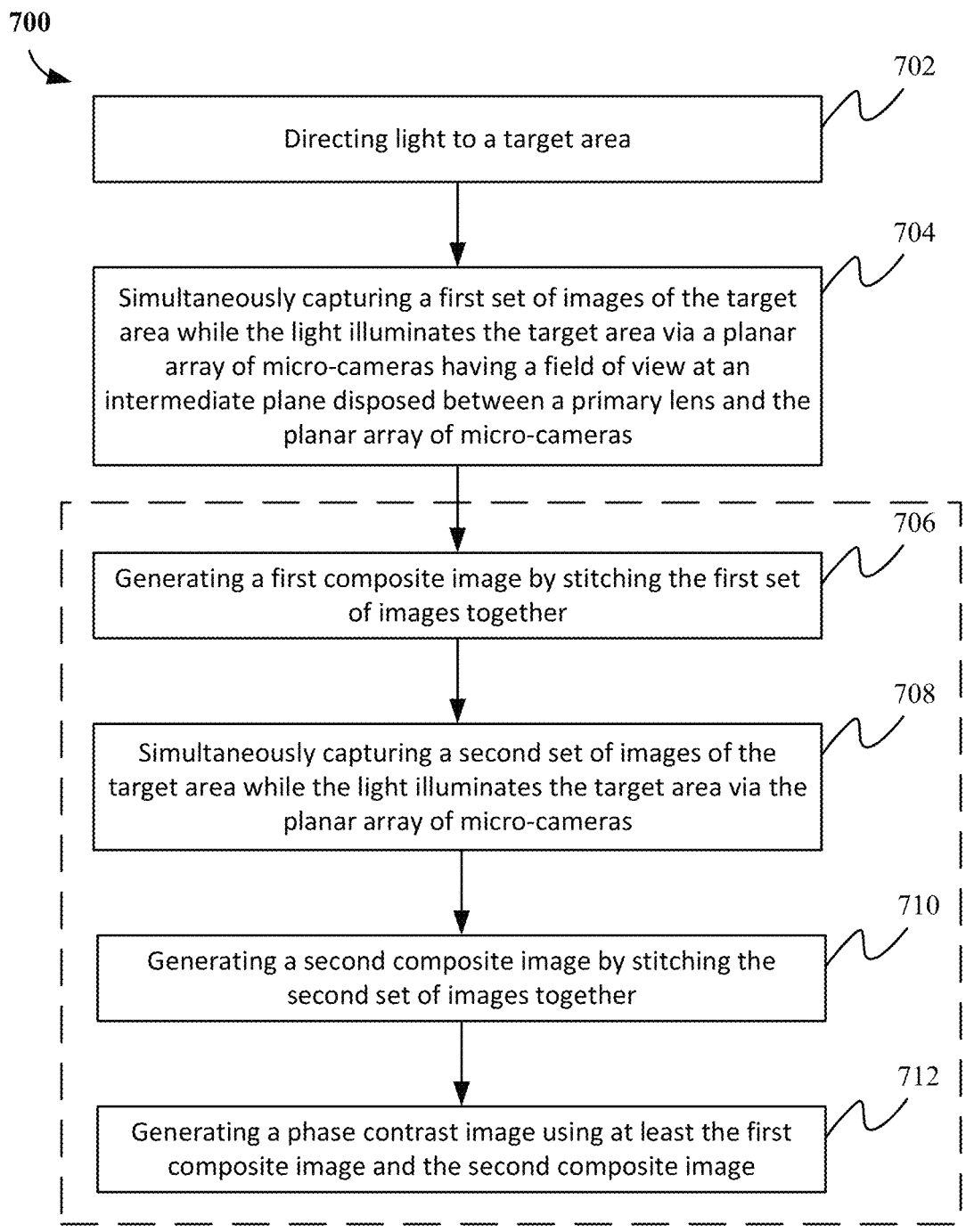
FIG. 7 illustrates a method of controlling a re-imaging microscopy system.

FIG. 7 illustrates a method of controlling a re-imaging microscopy system. Referring to FIG. 7, the method 700 includes directing (702) light to a target area and simultaneously capturing (704) a first set of images of the target area while the light illuminates the target area via a planar array of micro-cameras having a field of view at an intermediate plane disposed between a primary lens and the planar array of micro-cameras. A different image of the first set of images is simultaneously captured (704) by each micro-camera of the planar array.

In some cases, the method 700 further includes generating (706) a first composite image by stitching the first set of images together. In some cases, the method (700) further includes simultaneously capturing (708) a second set of images of the target area while the light illuminates the target area via the planar array of micro-cameras and generating (710) a second composite image by stitching the second set of images together. In some cases, the first composite image and the second composite image are compared/manipulated to form a single final composite image. In some cases, the method 700 further includes generating (712) a phase contrast image using at least the first composite image and the second composite image, wherein the light illuminates the target area from a different direction for the first set of images than the light that illuminates the target area for the second set of images.

In some cases, simultaneously capturing (708) the second set of images of the target area while the light illuminates the target area via the planar array of micro-cameras occurs at the same time as simultaneously capturing (704) a first set of images of the target area while the light illuminates the target area via a planar array of micro-cameras. Indeed, the planar array of micro-cameras may include alternating light filters that selectively pass different ranges of wavelengths of light, allowing for the simultaneous capture (704, 708) of two set of images (or more in cases where more than two different types of light filters are used by the micro-camera array as described with respect to FIGS. 4A and 4B).

In some cases, simultaneously capturing (708) the second set of images of the target area while the light illuminates the target area via the planar array of micro-cameras occurs at a different time as simultaneously capturing (704) a first set of images of the target area while the light illuminates the target area via a planar array of micro-cameras. For example, as described above with respect to generating (712) the phase contrast image, different sets of images can be captured (704, 708) utilizing light that illuminates the target area from different directions. Because light is utilized to capture (704, 708) two (or more) sets of images from different directions, capture of these different sets of images necessarily occurs at different times.

Generating (706, 710) composite images can be achieved using an image stitching algorithm. The stitching algorithm can contain feature-based detections, Fourier phase alignment, direct pixel-to-pixel comparisons based on a gradient descent method, and/or a viewpoint correction method. Denoising methods can also be applied depending on the type of intermediate platform used (if any). The general methods are BM3D and machine learning methods (e.g., noise2noise and/or noise2void), which allow training without a clean dataset. In some cases, depending on the type of intermediate platform used (if any), it is possible to calculate the transmittance of the intermediate platform and computationally remove the structural pattern. In some cases, the specimen can be shifted to get the general distribution of the pattern profile and remove the fixed pattern noise.

Figure 8A:
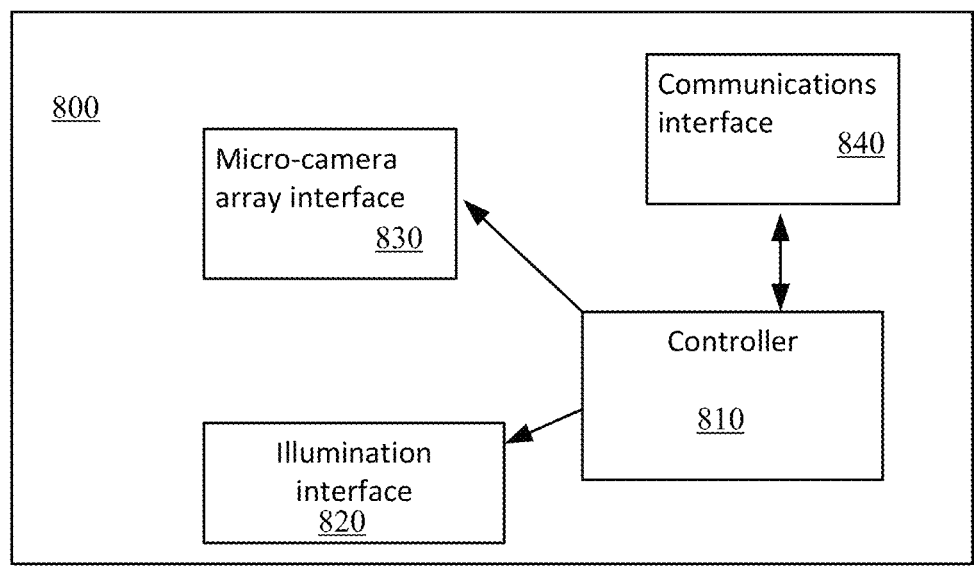
FIG. 8A illustrates a system controller for implementing functionality of a re-imaging microscopy system.

FIG. 8A illustrates a system controller for implementing functionality of a re-imaging microscopy system. A re-imaging microscopy system as described herein can include a system controller 800. Referring to FIG. 8A, the system controller 800 can include a controller 810 coupled to an illumination configuration via an illumination interface 820 and coupled to a micro-camera array via a micro-camera array interface 830. In some cases, the controller 810 can include or be coupled to a communications interface 840 for communicating with another computing device, for example computing device 850 described with respect to FIG. 8B. Controller 810 can include one or more processors with corresponding instructions for execution and/or control logic for controlling the illumination configuration such as described with respect to FIGS. 5A-5D and can include instructions (executed by the one or more processors) and/or control logic for control of the micro-cameras of the micro-camera array (and optional filters if they are configurable). Images captured by the micro-camera array can be processed at the controller or communicated to the other computing device via the communications interface 840. In some cases, controller 810 performs one or more of processes 702, 704, and 708 of FIG. 7.

Figure 8B:
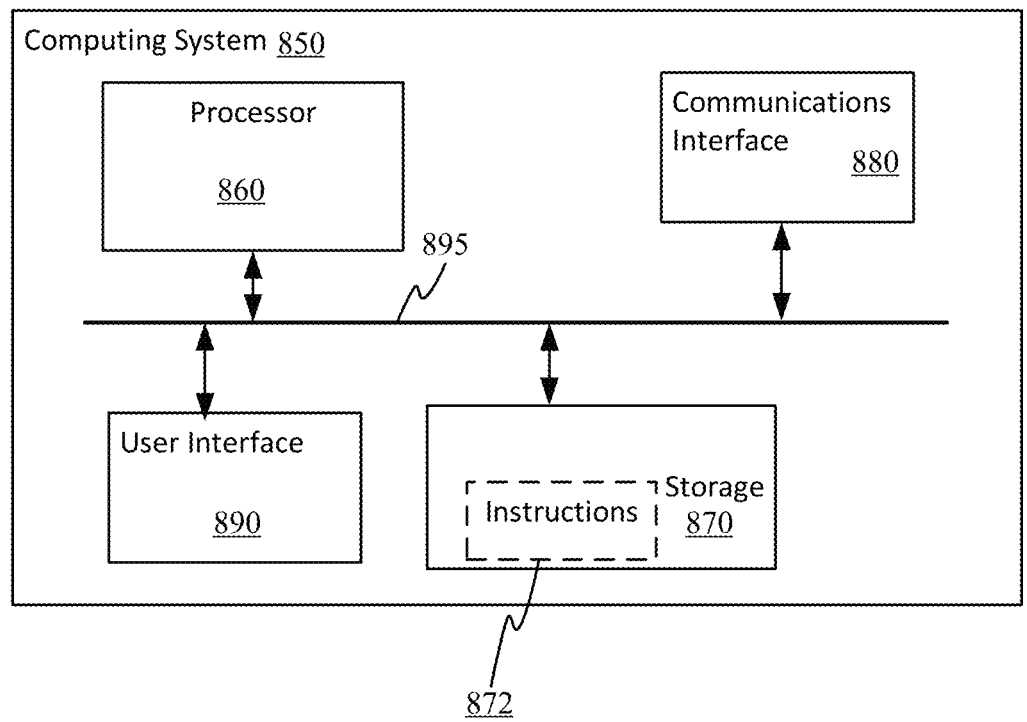
FIG. 8B illustrates a computing system that can be used for a re-imaging microscopy system.

FIG. 8B illustrates a computing system that can be used for a re-imaging microscopy system. Referring to FIG. 8B, a computing system 850 can include a processor 860, storage 870, a communications interface 880, and a user interface 890 coupled, for example, via a system bus 895. Processor 860 can include one or more of any suitable processing devices ("processors"), such as a microprocessor, central processing unit (CPU), graphics processing unit (GPU), field programmable gate arrays (FPGAs), application-specific integrated circuits (ASICs), logic circuits, state machines, application-specific standard products (ASSPs), system-on-a-chip systems (SOCs), complex programmable logic devices (CPLDs), etc. Storage 870 can include any suitable storage media that can store instructions 872 for generating composite images from the micro-camera array, including one or more of the processes 706, 710, and 712 of FIG. 7. Suitable storage media for storage 870 include random access memory, read only memory, magnetic disks, optical disks, CDs, DVDs, flash memory, magnetic cassettes, magnetic tape, magnetic disk storage or other magnetic storage devices, or any other suitable storage media. As used herein "storage media" do not consist of transitory, propagating waves. Instead, "storage media" refers to non-transitory media.

Communications interface 880 can include wired or wireless interfaces for communicating with a system controller such as described with respect to FIG. 8A as well as interfaces for communicating with the "outside world" (e.g., external networks). User interface 890 can include a display on which the composite images can be displayed as well as suitable input device interfaces for receiving user input (e.g., mouse, keyboard, microphone).

EXPERIMENT

The inventors conducted an experiment following an implementation similar to that illustrated in FIG. 3A using a primary objective lens (RMA Electronics, FL CC0814-5M) that offers optical SBP of several hundred megapixels and magnifies the sample onto an intermediate plane (8 mm×10 mm FOV, 16 cm×24 cm magnified image size). The planar array of micro-cameras contained 96 individual micro-cameras (8×12 grid, 19 mm pitch), each micro-camera being a rectangular CMOS sensor (Omnivision 108238, 4320× 2432 with a pixel size of 1.4 μm). The planar array of micro-cameras was jointly controlled by a custom electronics arrangement that simultaneously acquires image data from all of the micro-cameras (0.96 gigapixels acquired per snapshot). Each micro-camera utilized a 25 mm focal length lens (f/2.5, Edmund Optics). The planar array of micro-cameras had a field of view with 10% overlap in one direction (e.g., along the short side of the rectangular sensor) and 52% in another direction (e.g., along the long side of the rectangular sensor), ensuring each point in the composite image was captured by at least two micro-cameras.

A fiber bundle array used in the experiment included a thin, large plate of fused glass single-mode fibers to account for non-telecentricity of the primary lens. The entrance NA of each micro-camera lens was 0.032 while the NA of the primary lens was 0.36, which exceeds the cumulative entrance NA of the micro-camera array. A 6 μm fiber faceplate (SCHOTT, glass type: 47A) that is 5 mm thick was used. Four of these faceplates, each being 8 cm×12 cm in size, were placed directly beside one another to cover the intermediate image.

Each micro-camera simultaneously captured a de-magnified image of a unique portion of the intermediate image. Stitching those images together produced a composite image. Using this design setup, the half-pitch resolution of the planar array of micro-cameras was 9 µm (that is, when directly imaging a target at the intermediate image plane without a primary objective lens). The planar array of micro-cameras was placed 150 mm away from the intermediate plane with around 0.14 magnification. For the whole system with magnification of 3.81, the re-imaging microscopy system obtained a 2.2 µm maximum two-point resolution.

Software and Post-Processing

While the re-imaging microscopy system provided high-power Kohler illumination via a single large LED (3W) combined with multiple condenser lenses, vignetting effects introduced by the primary lens and fiber bundle array lead to a fixed intensity fall-off towards the edges of the composite field of view. To address this issue, the inventors used a pre-captured image to correct the vignetting and other non-even illumination effects. By assuming the uneven illumination is a low spatial frequency effect, the inventors first convolved the background image with a Gaussian kernel to create a reference image and then divided any subsequent images of the specimen with the illumination-correction reference.

Another issue is the introduction of a fixed, high-spatial frequency modulation pattern by the fiber bundle array (6 µm average diameter per fiber), whose fibers are smaller than the re-imaging microscopy system's resolution (9 µm half-pitch resolution) at the intermediate plane, yet still lead to a speckle-like modulation as seen in FIG. 9A. While the inventors noted that calculating the transmission matrix of the fiber bundle array could enable effective removal of the speckle-like modulation, the inventors instead opted to utilize a motorized stage to vibrate the fiber bundle array during finite image exposure. Specifically, the inventors used two methods to achieve fiber plate vibration: a time averaging method whose results are illustrated in FIG. 9B and a frames averaging method whose results are illustrated in FIG. 9C. For the time averaging method, the inventors vibrated the fiber bundle array within a fixed exposure time. For the frames averaging method, the inventors computed the average of 10 frames as the fiber bundle array was randomly displaced.

Results

To assess the resolution of the re-imaging microscopy system, the inventors translated a USAF resolution target (Ready Optics) via a manual 3-axis stage to different areas of the entire field of view. At the center of the field of view of the central micro-camera in the planar array of micro-cameras, the inventors measured a 2.2 µm two-point resolution, which drops towards the edges of the central micro-camera field of view. At the center of the field of view of an edge micro-camera of the planar array of micro-cameras, the inventors measured a 3.1 µm two-point resolution, which drops towards the edges of the edge micro-camera field of view. FIG. 10A illustrates the benefit of adopting the fiber bundle array; specifically, vignetting severely limited the observable micro-camera field of view of this 10 µm fluorescent microsphere calibration specimen. After the fiber bundle array was placed at the intermediate plane, the array fibers, with NA approximately equal to 1, expand incident light across a larger outgoing cone to ensure effective image formation, albeit with speckle noise, as illustrated in FIG. 10B. Using the time averaging method (e.g., translating the fiber bundle array 1 mm within a 0.2 s exposure time) leads to the resulting image illustrated in FIG. 10C. The inventors noted that the results of the time averaging method and the frames averaging method would further benefit from further post-processing improvements, such as deconvolution with an a-priori obtained point spread function and/or additional denoising.

To explore the flexibility of the re-imaging microscopy system, the inventors modified the illumination unit to include the ability to capture Differential Phase Contrast (DPC) imagery. After magnifying the 3 mm active area LED source by 3 times via a first 1 in 16 mm focal length condenser (ACL25416U, Thorlabs) and two subsequent 2.95 in 60 mm lenses (ACL7560U, Thorlabs), the inventors subsequently inserted an absorption mask at the illumination source jugate plane (between the two 60 mm focal length condensers) for DPC modulation. In this design setup, the specimen is located at the focus of the second 60 mm condenser, which is the Fourier plane of the DPC mask. To first quantitatively evaluate performance, the inventors imaged a large collection of 10 µm diameter polystyrene microspheres (refractive index: n=1.59) immersed in n=1.58 oil. To provide DPC modulation, the inventors inserted 4 unique half-circle masks oriented along 4 cardinal directions and captured 4 snapshots. The resulting phase contrast maps are illustrated in FIG. 11A, with average 1D traces through 10 randomly selected beads illustrated in FIG. 11B, both for beads at the micro-camera field of view center and edge. Comparing these average traces to an analytically derived phase contrast profile of a 10 µm microsphere (n=1.59) captured by a simplified one-objective DPC imaging with matching specifications (0.3 primary objective lens NA, 0.8 for half circle illumination) highlights accurate performance albeit with slightly lower contrast and increased noise.

Next, the inventors tested the effectiveness of the re-imaging microscopy system capturing images of buccal epithelial cell samples, which are mostly transparent and thus exhibit minimal structure contrast under a standard brightfield microscope. For this experiment, the inventors employed ring-shaped DPC masks with 0.7 outer NA and 0.5 inner NA. The inventors fixed the buccal epithelial cells on a glass slide with 100% ethanol and dried with a cover slip to produce the low-contrast bright-field whole field of view as illustrated in FIG. 11A, while the DPC images (a1-a4) reveal detailed phase specific features within the cells.

As a first demonstration of snapshot multi-modal acquisition with a multi-scale microscope, the inventors configured the re-imaging microscopy system to acquire dual-channel florescence video. Along an X direction, which exhibited more than 50% field of view intracameral overlap, the inventors alternated red and green emissions filters over successive micro-camera columns. Hence, the inventors got the full field of view (except for corner micro-cameras) covered with both red and green filters, which allowed the inventors to image red and green channel fluorescence simultaneously. For the proof-of-concept, the inventors imaged the mixture of 10 µm red (58010 nm/60510 nm) and 6 µm yellow-green microspheres (44110 nm/48610 nm). The inventors demonstrated the dual-channel fluorescent imaging using customized red filters centered at 610 nm (Chroma, ET610/75m) and green filters centered at 510 nm (Chroma, ET510/20m). For fluorescence excitation, the inventors used a custom-built high power 470 nm blue LED (Chanzon, 100W Blue) with a short-pass filter (Throlabs, FES500) inserted at the output. The filters were mounted on 4×D printed frames and attached to the system via magnets. The inventors stitched the two channels separately together using PTGui. The results are illustrated in FIGS. 12A and 12B, with a zoomed in version illustrated in FIG. 12C. This setup achieved imaging of 6 μm yellow-green microspheres (FIG. 12B) and 10 m red microspheres (FIG. 12A).

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A microscopy system, comprising:
   a primary lens magnifying a target area to a back focal plane; and
   a planar array of micro-cameras positioned a distance away from the back focal plane, each micro-camera of the planar array of micro-cameras having a field of view at the back focal plane that overlaps at least one other micro-camera's field of view at the back focal plane at least 50% in a direction and receiving light from a unique portion of the back focal plane, wherein the distance between the planar array of micro-cameras and the back focal plane consists of an open air gap;
   wherein the primary lens is disposed in a light path between the planar array of micro-cameras and the target area.

2. The system of claim 1, further comprising a fiber bundle array disposed at the back focal plane at the distance away from the planar array of micro-cameras and in the light path between the planar array of micro-cameras and the primary lens.

3. The system of claim 2, wherein fibers of the fiber bundle array are glass.

4. The system of claim 1, further comprising a diffuser element disposed at the back focal plane at the distance away from the planar array of micro-cameras and in the light path between the planar array of micro-cameras and the primary lens.

5. The system of claim 1, further comprising an illumination source configured to provide light from a plurality of directions to the target area.

6. The system of claim 5, wherein the illumination source is further configured to provide light from a single direction of the plurality of directions at a time.

7. The system of claim 6, wherein the planar array of cameras captures an image of the target area for each of the plurality of directions.

8. A method of microscopy imaging, comprising:
   directing light to a target area; and
   simultaneously capturing a first set of images of the target area while the light illuminates the target area via a planar array of micro-cameras positioned a distance away from a back focal plane and having a field of view at the back focal plane disposed between a primary lens magnifying a target area to the back focal plane and the planar array of micro-cameras, each micro-camera of the planar array having a field of view at the back focal plane that overlaps at least one other micro-camera's field of view at least 50% in a direction and receiving light from a unique portion of the back focal plane, wherein the distance between the planar array of micro-cameras and the back focal plane consists of an open air gap, wherein a different image of the first set of images is simultaneously captured by each micro-camera of the planar array.

9. The method of claim 8, further comprising generating a first composite image by stitching the first set of images together.

10. The method of claim 9, further comprising:
    simultaneously capturing, via the planar array of micro-cameras, a second set of images of the target area while the light illuminates the target area; and
    generating a second composite image by stitching the second set of images together.

11. The method of claim 10, further comprising generating a phase contrast image using at least the first composite image and the second composite image, wherein the light illuminates the target area from a different direction for the first set of images than the light that illuminates the target area for the second set of images.

12. The method of claim 8, wherein the light is introduced to the target area by at least one light source coupled to a moveable arm.

13. The method of claim 8, wherein the light is introduced to the target area via one or more lights of a plurality of lights.

14. The system of claim 1, wherein each micro-camera of the planar array of micro-cameras comprises a lens, a light sensor, and a first type of filter or a second type of filter covering the lens.

15. The system of claim 14, wherein the planar array of micro-cameras includes an alternating pattern of the first type of filter and the second type of filter in the direction.

16. The system of claim 14, wherein the first type of light filter and the second type of light filter covering the lens selectively pass different ranges of wavelengths of light.

17. The system of claim 14, wherein at least one of the first type of light filter and the second type of light filter covering the lens is a polarizing filter.

18. The method of claim 8, wherein each micro-camera of the planar array of micro-cameras comprises a lens, a light sensor, and a first type of filter or a second type of filter covering the lens, wherein the planar array of micro-cameras includes an alternating pattern of the first type of filter and the second type of filter in the direction;
    wherein the method further comprises:
      generating a first filter type composite image of the target area by stitching a first sub-set of images of the first set of images captured by micro-cameras of the planar array of micro-cameras having the first type of filter together; and
      generating a second filter type composite image of the target area by stitching a second sub-set of images of the first set of images captured by micro-cameras of the planar array of micro-cameras having the second type of filter together.

19. The system of claim 14, wherein the first type of light filter is a first fluorescent filter and the second type of light filter covering the lens is a second fluorescent filter.

20. The method of claim 9, wherein the first composite image includes a 2.2 μm maximum two-point resolution.

\* \* \* \* \*